(12) United States Patent
Bailey et al.

(10) Patent No.: US 7,509,272 B2
(45) Date of Patent: Mar. 24, 2009

(54) CALENDAR AUCTION METHOD AND COMPUTER PROGRAM PRODUCT

(75) Inventors: William Bailey, Phoenix, AZ (US); Jeffrey S. Fehlhaber, Glendale, AZ (US); Marla Flatbush, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 547 days.

(21) Appl. No.: 10/710,068

(22) Filed: Jun. 16, 2004

(65) Prior Publication Data

US 2005/0283420 A1 Dec. 22, 2005

(51) Int. Cl.
*G06Q 30/00* (2006.01)
(52) U.S. Cl. ....................................................... 705/26
(58) Field of Classification Search .................... 705/26, 705/27, 37
See application file for complete search history.

(56) References Cited

U.S. PATENT DOCUMENTS

| | | | |
|---|---|---|---|
| 5,025,372 A | 6/1991 | Burton et al. |
| 5,056,019 A | 10/1991 | Schultz et al. |
| 5,128,752 A | 7/1992 | Von Kohorn |
| 5,200,889 A | 4/1993 | Mori |
| 5,202,826 A | 4/1993 | McCarthy |
| 5,233,514 A | 8/1993 | Ayyoubi et al. |
| 5,287,268 A | 2/1994 | McCarthy |
| 5,483,444 A | 1/1996 | Heintzeman et al. |
| 5,734,838 A | 3/1998 | Robinson et al. |
| 5,774,870 A | 6/1998 | Storey |
| 5,806,045 A | 9/1998 | Biorge et al. |
| 5,905,975 A | 5/1999 | Ausubel |
| 5,907,831 A | 5/1999 | Lotvin et al. |
| 5,923,016 A | 7/1999 | Fredregill et al. |
| 5,937,391 A | 8/1999 | Ikeda et al. |
| 5,983,205 A | 11/1999 | Brams et al. |
| 6,009,411 A | 12/1999 | Kepecs |
| 6,009,412 A | 12/1999 | Storey |
| 6,012,045 A * | 1/2000 | Barzilai et al. ................ 705/37 |
| 6,061,660 A | 5/2000 | Eggleston et al. |
| 6,101,484 A | 8/2000 | Halbert et al. |
| 6,138,911 A | 10/2000 | Fredregill et al. |
| 6,178,408 B1 * | 1/2001 | Copple et al. ................ 705/14 |
| 6,243,688 B1 | 6/2001 | Kalina |
| 6,251,017 B1 | 6/2001 | Leason et al. |

(Continued)

OTHER PUBLICATIONS

Tsetlin Ilya, "Common value auctions with unknown number of bidders: Uniform and discriminatory pricing", Duke University, 2003, 108 pages; AAT 3120201 http://proquest.umi.com/pqdweb?did=765267731&sid=1&Fmt=2&clientId=19649&RQT=309&VName=PQD.*

*Primary Examiner*—Jeffrey A. Smith
*Assistant Examiner*—Mila Airapetian
(74) *Attorney, Agent, or Firm*—Fitzpatrick, Cella, Harper & Scinto

(57) ABSTRACT

The present invention facilitates a calendar auction over a computerized network wherein consumers of professional services may bid on calendar timeslots for needed professional services. A provider creates an account and manages an online calendar to facilitate auctions for defined timeslots. A consumer also creates an account and manages an online calendar to solicit calendar auctions for specific needed professional services over defined times-lots. Both provider and consumer manage their calendar auction accounts and calendar over a computerized network such as the internet.

29 Claims, 10 Drawing Sheets

U.S. PATENT DOCUMENTS

| | | |
|---|---|---|
| 6,253,189 B1 | 6/2001 | Feezell et al. |
| 6,267,672 B1 | 7/2001 | Vance |
| 6,334,111 B1 | 12/2001 | Carrott |
| 6,336,098 B1 | 1/2002 | Fortenberry et al. |
| 6,430,603 B2 | 8/2002 | Hunter |
| 6,430,605 B2 | 8/2002 | Hunter |
| 6,519,570 B1 | 2/2003 | Faber et al. |
| 6,532,448 B1 | 3/2003 | Higginson et al. |
| 6,594,640 B1 | 7/2003 | Postrel |
| 6,721,743 B1 | 4/2004 | Sakakibara |
| 6,741,969 B1 * | 5/2004 | Chen et al. .................... 705/14 |
| 7,349,884 B1 * | 3/2008 | Odom et al. .................. 705/40 |
| 2001/0014872 A1 | 8/2001 | Hunter |
| 2001/0032170 A1 * | 10/2001 | Sheth .......................... 705/37 |
| 2001/0034635 A1 * | 10/2001 | Winters ....................... 705/10 |
| 2001/0037241 A1 | 11/2001 | Puri |
| 2001/0049628 A1 | 12/2001 | Icho |
| 2001/0054003 A1 | 12/2001 | Chien et al. |
| 2001/0056395 A1 | 12/2001 | Khan |
| 2002/0010621 A1 | 1/2002 | Bell et al. |
| 2002/0013718 A1 | 1/2002 | Cornwell |
| 2002/0029182 A1 | 3/2002 | Nakagawa |
| 2002/0035536 A1 | 3/2002 | Gellman |
| 2002/0065757 A1 | 5/2002 | Lam |
| 2002/0065826 A1 | 5/2002 | Bell et al. |
| 2002/0077890 A1 | 6/2002 | LaPointe et al. |
| 2002/0095365 A1 | 7/2002 | Slavin et al. |
| 2002/0095391 A1 | 7/2002 | Swart et al. |
| 2002/0111893 A1 | 8/2002 | Shifrin-Cassidy |
| 2002/0120501 A1 | 8/2002 | Bell et al. |
| 2002/0120554 A1 * | 8/2002 | Vega ........................... 705/37 |
| 2002/0128916 A1 | 9/2002 | Beinecke, III |
| 2002/0143683 A1 | 10/2002 | Taylor |
| 2002/0156668 A1 | 10/2002 | Morrow et al. |
| 2002/0165776 A1 | 11/2002 | Hunter |
| 2002/0165817 A1 * | 11/2002 | Rackson et al. ............... 705/37 |
| 2003/0004799 A1 | 1/2003 | Kish |
| 2003/0004856 A1 * | 1/2003 | Brown et al. .................. 705/37 |
| 2003/0028471 A1 * | 2/2003 | Usui et al. .................... 705/37 |
| 2003/0041002 A1 | 2/2003 | Hao et al. |
| 2003/0041004 A1 | 2/2003 | Parry et al. |
| 2003/0041005 A1 * | 2/2003 | Parry et al. .................... 705/37 |
| 2003/0055729 A1 | 3/2003 | Bezos et al. |
| 2003/0065642 A1 | 4/2003 | Zee |
| 2003/0069828 A1 | 4/2003 | Blazey et al. |
| 2003/0074300 A1 | 4/2003 | Norris |
| 2003/0093357 A1 * | 5/2003 | Guler et al. ................... 705/37 |
| 2003/0187774 A1 | 10/2003 | Kummamuru et al. |
| 2003/0195838 A1 | 10/2003 | Henley |
| 2003/0204774 A1 | 10/2003 | Capek et al. |
| 2003/0208397 A1 | 11/2003 | Van Dusen |
| 2003/0212589 A1 | 11/2003 | Kish |
| 2003/0212624 A1 | 11/2003 | Sanghavi et al. |
| 2003/0225669 A1 | 12/2003 | Cohen |
| 2004/0039644 A1 | 2/2004 | Postrel |

* cited by examiner

CALENDAR AUCTION METHOD AND COMPUTER PROGRAM PRODUCT

FIELD OF INVENTION

The present invention relates generally to the management and delivery of intellectual capital and professional services by auctioning pre-defined timeslots for those services, and more particularly, to a system and method which allows a consumer of intellectual capital and professional services to facilitate bids within an online calendar auction.

BACKGROUND OF INVENTION

Traditional auctions have been a tool of commerce for many years and the advantages of auctions are well known. Auctions are arguably the purest form of market driven commerce in a trade based economy. While allowing a provider an opportunity to obtain the highest price that a market may bear for his or her goods, the consumer has an opportunity to purchase goods at a fair price. The auction concept is simple, yet an auction has proven to be very popular because it may result in a win-win scenario for both providers and consumers. In an auction environment, one who wishes to trade goods for monetary value, simply solicits bids from those who wish to engage in trade for goods. When the bidding process is complete, either after expiration of a predetermined time or when bidding has ceased, the person offering the highest bid wins the opportunity to complete the trade transaction.

Since the advent of the world-wide web, auctions have expanded into a level of technology and complexity, but the concept has remained largely the same as the traditional auction. However, auctions are now no longer bound by geography and anyone who wishes to participate may do so with very little experience or knowledge. Online auctions have also become a profitable alternative to the limited distribution of a garage sale.

In the early years of online auctions, auction sites such as eBay® centered its business on consumers wishing to conduct business with other consumers (C2C). Later, on-line auctions began to appeal to business owners as an efficient and low cost system and/or method to market their products and move inventory to consumers (B2C). More recently, businesses seeking to conduct commerce with other businesses (B2B) are utilizing auction sites, such as eBay®, to participate in auctions for items ranging from office furniture to computing equipment. However, auctions are still being used simply as an ad hoc means of moving assets. As such, a strong need exists to provide an ongoing system and method for the management, scheduling and pricing of professional services.

Traditionally, auctions have been structured for trade of material goods for a currency value. In recent years, however, online auctions have evolved to serve a number of different markets. Reverse auctions, for example, allow suppliers of goods or services to bid on contracts. Also, online auctions accepting bids utilizing various forms of payment (e.g., loyalty points, frequent flyer miles), and even barter agreements are becoming more prevalent.

While most online auctions today remain primarily targeted toward goods, the service industries are increasingly discovering the value of online auctions. Consumers are increasingly being invited to participate in auctions for vacations, airfare, hotels, golf packages, and the like. Priceline.com®, for example, has helped change the travel industry by offering travelers an opportunity to purchase airfare, hotel reservations, car rentals, etc. at the lowest possible price or a price "selected" by the traveler. However, the Priceline.com model differs from an auction model in that, while it allows the consumer to place an offer or bid, consumers are not directly competing against other consumers as in a true auction environment.

In addition, while conventional auctions have been adapted for business to business auction transactions, the service based industries have only recently entered the business to consumer market in the form of online auctions. For the most part, businesses with markets residing primarily or exclusively with other businesses, remain confined to conventional servicing. Conventional servicing often relies on manual administration, or perhaps voice response, for scheduling administration. Conventional cost structure management often relies on market analysis, which is typically more expensive and slower. However, conventional services do not typically allow automatic online scheduling and pricing of professional services with built in demand forecasting and revenue management. Moreover, any existing scheduling processes are not sufficiently automated, and are expensive to administer.

Because of the growing acceptance and even preference toward auction based commerce, a need exists for a practical and efficient way for service based industries to offer professional services for auction. Moreover, market fluctuations over very short durations make it difficult for the service industry to assess the market for the purpose of structuring professional service offerings and fees. As such, a need exists for rapidly assessing and structuring professional service fees. A calendar auction system would produce advantages to both the provider and consumer in that professional services are usually needed during varying durations of time because demand for such services can be sporadic and unpredictable. As a result, a provider at times may experience periods of low demand, while at other times, may have difficulty staffing projects during periods of very high demand. Also, as a result of market fluctuations, consumers may find it difficult to locate professional services during peaks in demand. Therefore, not only would an auction provide an opportunity to obtain the highest possible rate for such services, but would prove to be an invaluable analysis tool in determining market demand and pricing structures.

SUMMARY OF INVENTION

The present invention overcomes the limitations and problems of the prior art by providing a system and method for conducting an online calendar auction. The system may facilitate a calendar auction between at least one consumer and at least one provider by, for example, posting an available service, wherein the service includes an available timeslot on the provider calendar when the service is offered to be performed; receiving at least one bid for the service, wherein the bid is based at least in part upon the service and the available timeslot; selecting the bid as a winning bid; and, notifying the consumer and the provider of the winning bid.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

Figure 1:
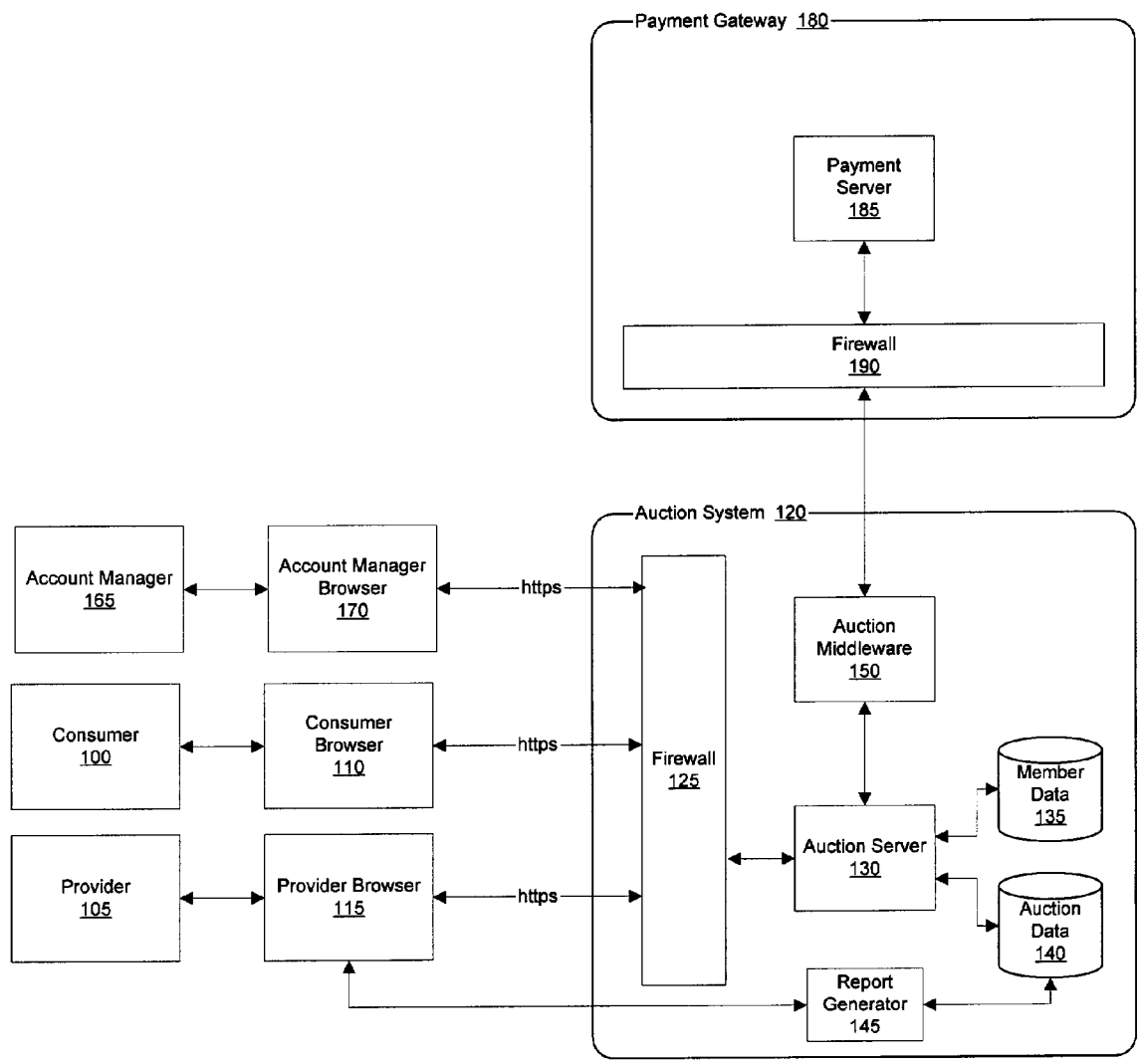
FIG. 1 is a block diagram illustrating the major system components for a calendar auction within an exemplary embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for facilitating an online auction. The invention enables a consumer 100 to participate in an auction for services, wherein the services may be offered by a provider 105. A provider 105 of such services may participate with a calendar auction by offering services for auction which may be scheduled in calendar timeslots. In one embodiment, with reference to FIG. 1, the system also includes one or more account manager 165, auction system 120 and payment gateway 180. Auction system 120 may include, in one embodiment, one or more firewall 125, auction server 130, member data 135, auction data 140, report generator 145 and auction middleware 150.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

A service, as used herein, may include action, non-action, agreement, assistance, guidance, access, advice, coaching, physical help, mental help, medical advice, legal input, financial advice, mentoring and/or the like. The service may have a value, but a value is not required. The service may be provided by a provider. The service may be associated with goods or items of monetary value. For example, the service may include advice from a corporate executive along with 100,000 frequent flyer points and the opportunity to run one of her businesses. In one embodiment, a service may include one or more of, for example, accounting services, legal services, consulting services, counseling services, internet access, access to computer services, coaching services, shopping services, entertainment, experiences (e.g., spending time with a famous person or corporate executive), donation to a charity, Big Brother/Sister, agreement to not solicit for a time period and/or the like.

A provider 105, as used herein, may include any individual, business, entity, government organization, software and/or hardware suitably configured to offer a service. The service may be offered on the online calendaring auction. The provider may be a third party who interacts with the online auction through an existing shopping gateway.

A consumer 100, as used herein, may include any individual, business, entity, software and/or hardware that desires to participate in the invention. The consumer may facilitate a trade transaction by offering an auction bid for a service offered by the provider for a calendar timeslot.

An account manager 165, as used herein, may include any individual, business, entity, software and/or hardware that owns or manages the calendar auction. The account manager 165 may own or manage some or all of the hardware and software components of the calendar auction system, however this is not necessary. For example, the account manager 165 may own or manage a calendar auction which is hosted by a third-party on a contract basis.

With continued reference to FIG. 1, the consumer 100, provider 105 and account manager 165 may interface with the system via any communication protocol, device or method discussed herein. In one embodiment, the consumer 100, provider 105 and account manager 165 may interface with the system via an internet browser. Consumer browser 110, provider browser 115 and account manager browser 170 may comprise any hardware and/or software suitably configured to facilitate input, receipt and/or review of any information related to auction system 120 or any information discussed herein. Consumer browser, provider browser 115 and account manager browser 170 may include any device (e.g., personal computer) which communicates (in any manner discussed herein) with auction server 120 via any network discussed herein. Such browser applications comprise Internet browsing software installed within a computing unit or system to conduct online commerce transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like. Practitioners will appreciate that account manager 165 may or may not interact with the auction system through a browser application, but through a host terminal or the server directly. The system may also include access rights and different levels of access to different portions of the system for different entities.

Auction server 130 may include any hardware and/or software suitably configured to facilitate management of an auction, and in one embodiment, a calendar auction. Auction server 130 may interface directly or indirectly with consumer browser 110, provider browser 115, auction middleware 150, member database 135, and/or auction database 140. Auction server 130 may operate as a single entity in a single geographic location or as separate computing components located together or in separate geographic locations. Further, auction server 130 may be an Internet server or may send, receive and process data via a network both to and from a separate Internet server. Auction server 120 may be configured to dispatch requests to the components behind the firewall 125 which prevents direct access to the auction system 120 components. Data transmissions from the consumer browser 110, provider browser 115, and account manager browser 170 may pass through the firewall 125, and may be processed by the auction server 130 which commits data to either the member database 135 or auction database 140. For the purpose of simplicity, the member database 135 and auction database 140 are illustrated and described herein as two distinct databases. One skilled in the art will appreciate that the auction system 120 databases may be of any number of configurations. Further, as described in detail below, the member database 135 and the auction database 140 may be any type of database, such as relational, hierarchical, object-oriented, and/or the like.

Member database 135 may include any hardware and/or software suitably configured to facilitate storing consumer 100 and provider 105 information. Consumer 100 information may include, for example, names of a companies or individuals, street addresses, telephone numbers, email addresses, biographic information, credit rating, services of interest, loyalty point information, financial account information, and/or the like. Provider 105 information may include, for example, names of a companies or individuals, street addresses, telephone numbers, email addresses, biographic information, credit rating, descriptions of services provided, financial settlement information and/or the like.

Auction database 140 may include any hardware and/or software suitably configured to facilitate storing information relating to calendar auctions. The auction information may relate to past, present or future auctions. Auction database may store information originating with both consumer 100 and provider 105. Auction database 140 may include specific or general information relating to consumer 100 and/or provider 105 participation in certain auctions.

Firewall 125 may include any hardware and/or software suitably configured to protect auction system 120 resources from users from other networks and provide limited or restricted access to consumer 100, provider 105 and account manager 165. Firewall 125 may reside in varying configurations including Stateful Inspection, Proxy based and Packet Filtering among others. Firewall 125 may be integrated within auction server 130, any other system components or may reside as a separate element.

Report generator 145 may include any hardware and/or software suitably configured to produce reports from information stored in one or more databases. Report generators are commercially available and known in the art. Report generator 145 may provide printed reports, web access to reports, graphs, real-time information, raw data, batch information and/or the like. The report generator 145 may be implemented through commercially available hardware and/or software, through custom hardware and/or software components, or through a combination thereof. Further, report generator 145 may reside as a standalone system within a network auction system 120 or may be a software component installed in an auction server 130. Report generator 145 may be configured to process requests from the provider browser 115 to query either the member database 135, auction database 140, or a combination of both. Data received from the query may be formatted by the report generator 145 and transmitted to the provider browser 115. As illustrated and discussed herein, the report generator processes report requests for the provider browser, however practitioners will appreciate that the report generator 145 may also be accessed by the account manager browser 170 and consumer browser 110 to facilitate providing reports to other parties.

The reports may include service information, bid information or consumer information. Such information may include bids received, amount of bids received, distribution of bids received, identity of bidder, location of bidder, time of bid placement, date of bid placement, or service pricing. The reports may also facilitate the development of, or projections related to, service pricing, marketing plans, cash flow management, business capacity provisioning and resource provisioning.

Auction middleware 150 may include any hardware and/or software suitably configured to facilitate communications and/or process transactions between disparate computing systems. Middleware components are commercially available and known in the art. The auction middleware 150 may be implemented through commercially available hardware and/or software, through custom hardware and/or software components, or through a combination thereof. Auction middleware 150 may reside in a variety of configurations and may exist as a standalone system or may be a software component residing on the auction server 130. Auction middleware may be configured to process transactions between the auction server 130 and provider server 170 residing within a payment gateway 180.

Payment gateway 180 may include any hardware and/or software suitably configured to settle payments with provider 105. Payment gateway 180 may directly or indirectly interface with auction system 120. Payment gateway 180 may also include any known payment networks. Payments, as used herein, may include any monetary or nonmonetary form of payment such as, for example, cash, transaction account, transaction instruments, negotiable instruments, gift cards, rebates, securities, loyalty points, barter for goods or services and/or the like. In one embodiment, payment gateway 180 includes provider server 185 and firewall 190. Payment gateway 180 may include existing proprietary networks that presently accommodate transactions for credit cards, debit cards, and other types of financial/banking cards. Payment gateway 180 may be an open or closed network that is assumed to be secure from eavesdroppers. Exemplary transaction networks may include the American Express®, VisaNet® and the Veriphone® networks.

Provider server 170 may include any hardware and/or software suitably configured to facilitate management payments to provider. Provider server 170 may operate as a single entity in a single geographic location or as separate computing components located together or in separate geographic locations. Further, provider server 170 may be an Internet server or may send, receive and process data via a network both to and from a separate Internet server.

Firewall 190 may include any hardware and/or software suitably configured to protect provider server 170 from users from other networks and provide limited or restricted access to consumer 100, provider 105 and account manager 165. Firewall 190 may reside in varying configurations including Stateful Inspection, Proxy based and Packet Filtering among others. Firewall 190 may be integrated within provider server 170, any other system components or may reside as a separate element.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, "INTERNET STANDARDS AND PROTOCOLS" (1998); "JAVA 2 COMPLETE," various authors, (Sybex 1999); DEBORAH RAY AND ERIC RAY, "MASTERING HTML 4.0" (1997); and LOSHIN, "TCP/IP CLEARLY EXPLAINED" (1997) and DAVID GOURLEY AND BRIAN TOTTY, "HTTP, THE DEFINITIVE GUIDE" (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, "UNDERSTANDING DATA COMMUNICATIONS" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, "IT WEB SERVICES: A ROADMAP FOR THE ENTERPRISE" (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

Each provider, consumer, or application manager may be equipped with a computing device in order to interact with the system and facilitate online commerce transactions. The provider and consumer each have a computing unit in the form of a personal computer, although other types of computing units may be used including laptops, notebooks, hand held computers, set-top boxes, cellular telephones, touch-tone telephones and the like. The account manager has a computing unit implemented in the form of a computer-server, although other implementations are contemplated by the invention. The provider has a computing center shown as a server. However, the provider computing center may be implemented in other forms, such as a mini-computer, a PC server, a network of computers located in the same of different geographic locations, or the like. Moreover, the system contemplates the use, sale or distribution of any services or information over any network having similar functionality described herein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referring now to FIGS. 2-10, the process flows depicted are merely exemplary embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2-10, but also to the various system components as described above with reference to FIG. 1. Further, illustrations of the process flows and the descriptions thereof make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages but have been combined for simplicity.

A provider 105 may initiate the registration process through any methods known in the art. In one embodiment, provider 105 accesses an auction system 120 and initiates the account setup process through a web browser 110. The account setup process may include an auction system 120 determining if provider 105 is a new user or a returning user which may be accomplished through any method known in the art, for example, by the use of cookies, or direct user input. For example, a provider 105 may be presented with a temporary account setup webpage, which prompts the provider 105 to input information concerning the provider's 105 status as either a new or returning provider. An account manager 165 may define data that is required to be entered by provider 105 during the registration process. For example, an auction system 120 may not allow a provider 105 to continue with the registration process without entering basic company information such as company name, address, telephone number, email address, etc. However, an auction system may allow the registration process to continue if provider 105 does not complete a biography of provider's 105 service. The system may also obtain provider or consumer information from available public databases or third party sources.

Figure 2:
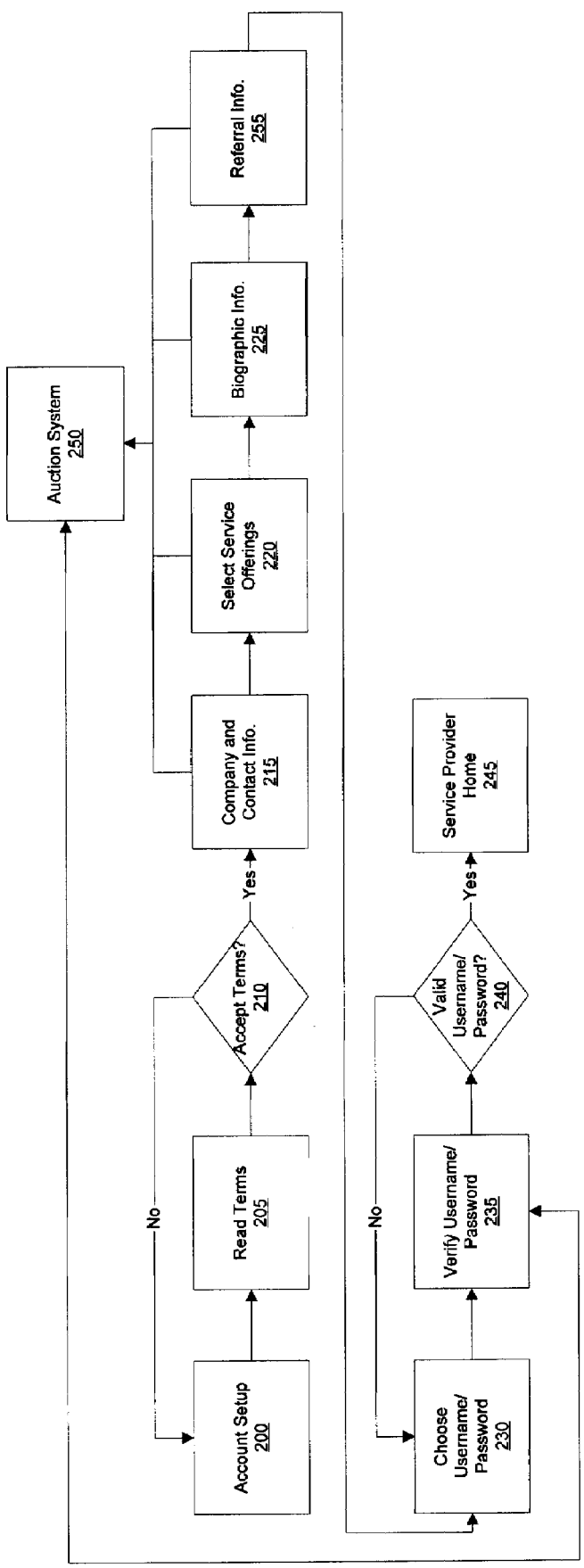
FIG. 2 is a flow chart illustrating an exemplary method for a provider to register its company to begin offering professional services for auction.

Referring to FIG. 2, if it is determined that provider 105 is new to a calendar auction system, as discussed above, provider 105 may be presented with an account setup (step 200) webpage whereby the account setup process may be initiated. If provider 105 chooses to initiate the account setup process, they may be presented a webpage containing terms (step 205) for participating in a calendar auction system. Further, provider 105 may be prompted to read the terms and provide input indicating whether or not provider 105 accepts the terms. If provider's 105 input indicates that the terms are not accepted (step 210), registration may not be continued and provider 105 may be again presented with an account setup (step 200) webpage. However, if provider's 105 input indicates that the terms are accepted (step 210), then provider 105 may be presented a webpage for which to enter information (step 215) such as, for example, company name, address, telephone number, name of a contact, email address, company website, etc. When provider 105 completes and submits company and other information (step 125), the provider information may be transmitted to the auction system (step 250) where it may be stored in member database 135.

Provider 105 may also be presented a webpage and prompted to select from a list of services (step 220) that provider 105 would like to offer for calendar auction bid. For example, if provider 105 is a CPA, he may select one or more specific services he is capable of delivering, such as payroll accounting, ledger services, taxes, etc. Provider 105 may also provide varying levels of service based on a selected service. Varying levels of service may be appropriate based upon several factors relating to variants in provider's 105 personnel which may include, for example, level of experience, education, training, certifications, memberships, etc.

In one embodiment, an auction system may be configured to automatically direct losing bidders and/or those placing bids below a reserve amount to offerings by the same provider 105 for lower level services. For example, a law firm participating in an online auction may offer a calendar timeslot for bankruptcy legal services of a senior partner with a reserve of $250.00 per hour. A consumer 100 interested in the legal service who places a bid at $160.00 may be directed to another auction for bankruptcy legal services offered by the same law firm, but from a nonpartner attorney with a reserve set at $150.00. The invention or any participant may also distribute or redeem loyalty points during any part of the method. For example, a referral recipient may send provider loyalty points in exchange for sending the referral. In another embodiment, the system may award loyalty points to a provider for referring the service to another participating provider.

Auction system 120 may additionally or alternatively allow provider 105 to enter information related to their services, or auction system 120 may acquire service information from provider 105 website or other database. The service offerings information may be transmitted to the auction system (step 250) where it may be stored in member database 135.

Providers 105 may then be presented a webpage to enter biographic information (step 225) which may include, for example, a short history of provider's 105 company, a description of the management team, client list, stock symbol, balance sheet data, credit rating, etc. The biographic information may be transmitted to the auction system (step 250) where it may be stored in member database 135.

Providers 105 may be provided a webpage where they may list one or more providers offering like services to their own in order to serve as referrals (step 255) if for any reason, provider cannot deliver service offerings to a participating consumer. There are a number of scenarios where this may be beneficial to both provider 105 and consumer 100. For example, if a consumer 100 places a bid that falls short of a reserve amount, it may be clear that the consumer 100 cannot, or is not willing to pay the provider's bottom rate. The consumer 100 may be presented with one or more provider 105 referrals which may be able to offer a similar service at a lower rate. If a referred provider is a participant in the calendar auction, consumer 100 may be directed to view calendar auction slots for that provider 105.

If provider 105 is not a calendar auction participant, then they may be alerted to a consumer's 100 interest in their service via email or any other means of notification. Alternatively, a link to a referrals website may be provided in order to allow a consumer 100 to obtain information regarding the referral and/or contact information. A calendar auction system may employ a means to identify a consumer 100 who selects a link to a referral's website. This information may be collected and used for market analysis, crediting a provider 105 who made the referral or for any other purpose. Practitioners will appreciate that there are a number of methods known in the art for collecting information regarding "click-throughs" in an Internet environment, including the use of cookies and URL tags.

If a consumer 100 obtains a calendar slot for a referred provider 105, either by placing a winning bid or by utilizing a "buy it now" option, then referring provider 105 may receive compensation, or a "finders fee". Additionally, a consumer 100 may view referrals for a particular provider 105 without participating in an auction. For example, a small florist may have a strong preference for the accounting services of a participating large Fortune 500 accounting firm. It may be valuable for the florist, knowing that her company is too small to afford the services of the large firm, to see the accounting firm's referrals who may include credible smaller accounting firms or independent CPA's.

When provider 105 completes input within a referral information webpage (step 255), the referral information may be transmitted to the auction system (step 250) where it may be stored in member database 135.

Provider 105 may also be presented a webpage where provider 105 may be prompted to choose a user ID and/or password (step 230). The user ID and/or password may be used by the auction system 120 to verify provider's 105 identification prior to participation in a calendar auction system. Provider 105 may submit a username and/or password selection to auction system (step 250) where it may be verified (step 235). If a user ID and/or password is not verified (step 240), provider 105 may again be presented a choose user ID/password webpage (step 230) where provider 105 may select a different user ID and/or password. If a user ID and/or password are valid (step 240), then provider 105 may be presented a provider home webpage (step 245).

Figure 3:
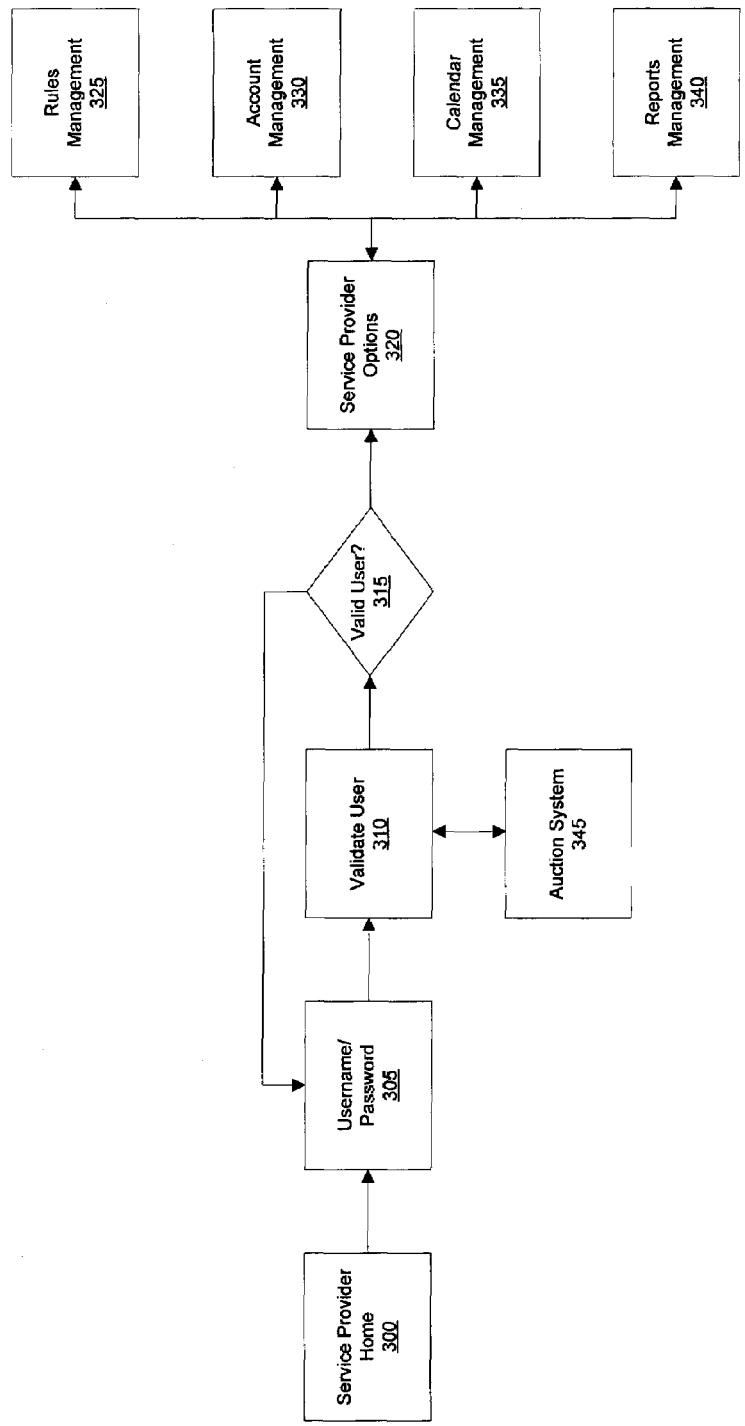
FIG. 3 is a flow chart illustrating an exemplary method for a provider to securely login to the auction system to manage account details, auction rules and auction calendar.

Referring now to FIG. 3, a provider homepage (step 300) may present provider 105 with various calendar auction related information. For example, in various embodiments, provider homepage (step 300) may present provider 105 with industry news and/or general auction statistics relating to the industry of provider 105. In an exemplary embodiment, auction system 120 may provide a central location where provider 105 may manage several aspects of a calendar auction account. To initiate auction account management functions, provider 105 may access a provider homepage (step 300). If provider 105 chooses to view and/or modify provider options (step 320), provider 105 may be prompted to enter a user ID and/or password (step 305). Once the user ID and/or password is entered, it may be transmitted to the auction system (step 345) to be authenticated. If the provider 105 is properly authenticated (step 315), provider 105 may be granted access to a provider options webpage. A provider 105 who is not properly authenticated, either through user error or because of unauthorized use, is not permitted further access to provider options (step 320) and may be again prompted (step 305) to enter a user ID and/or password. Practitioners will appreciate that many additional security measures may be employed in accordance with the login and authentication systems and methods described herein.

The provider options webpage (step 320) may contain links directed toward other webpages for managing various aspects of a calendar auction account. Calendar auction options which may be configured by provider 105 may include, rules management (step 325), account management (Step 330), calendar management (step 335) and reports management (step 340), each being described in greater detail below.

A rules management webpage (step 325) may be accessed by provider 105 to configure rules specific to a calendar auction. Such rules may be defined by provider 105 in advance of an auction in order to more closely control the nature of the auction. Such rules may include, for example, setting durations for auctions, setting reserve amounts for one or more service offerings, conditions for providing referrals, defining consumer 100 criteria requirements for participating in provider's 105 auctions and setting a price for one or more service offerings for which provider 105 may accept should a consumer decide to purchase a calendar timeslot and thus bypass the bidding process. The rules management (step 325) process will be described in greater detail below with the discussion of FIG. 4.

An account management webpage (step 330) may be accessed by provider 105 to add and/or modify company specific information as submitted during the registration process as illustrated in FIG. 2. Specifically, provider 105 may add and/or modify company and contact information as entered (215 in FIG. 2). Such information may include company name, contact name, street address, telephone number, email address, website address, and the like. Account management (step 330) may also be used to add and/or modify provider's (105) service offerings and service descriptions, as entered (220 in FIG. 2) and biographical information as entered (225 in FIG. 2). The account management process will be described in greater detail below with a discussion of FIG. 5.

A calendar management webpage (step 335) may be accessed by provider 105 to facilitate one or more calendar auctions for provider's service(s). Provider 105 may access a calendar covering any time period as defined by an auction account manager 165. In one embodiment, a provider 105 may access a calendar for a particular month by selecting the month from a list, however practitioners will appreciate that that various other options may be provided for displaying calendars or elements of time. Provider 105 may also provide information to the calendar management webpage by downloading information from an electronic calendar or personal digital assistant. Calendar management may allow provider 105, for example, to view scheduled auctions, schedule calendar auctions to take place at a determined date and time, define auction durations, configure reoccurring auctions, cancel scheduled auctions, etc. The calendar management process will be described in greater detail below with a discussion of FIG. 6.

A reports management webpage (step 340) may be accessed by provider 105 to view reports based on auction history. In an exemplary embodiment, the auction system 120 may provide standard and/or custom reports which may equip provider 105 with an analysis tool for determining and/or executing strategic decisions. For example, a financial consultant offering her services for a calendar auction on a regular basis may choose to view a report showing details for all winning bids. From her analysis of the report information, the financial consultant may determine that the volume of bids as well as the high bid amount for financial consulting services is significantly higher in the last week of each month. With this information, the financial consultant may choose to auction more calendar time during the last week of each month.

Reports generated from a reports management webpage (step 340) may also show a provider 105 what types of consumers 100 are bidding for their services and/or related providers services. Demographic data such as, for example, consumer 100 information, bid amounts, trends in bidding activity and the like, may be a valuable tool to assist provider 105 in developing a marketing and pricing strategy. For example, a provider who has set a "buy it now" price at $180 per hour for a service, may discover that winning bids for comparable services from other providers are averaging $120 per hour. This information combined with other report data may make it clear that the provider is over-pricing his services. Further, a report may provide a listing of all consumers 100 who have participated in an auction for a particular service type. This may be utilized by a provider 105 for business development and marketing tasks.

While not illustrated herein, a practitioner will appreciate that various tools and methods may be employed to compile, display, print and store reports as described above and within the context of a calendar auction system. Further, it will be appreciated that reports management (step 340) may be carried out through a number commercially available report generators, through custom software and/or hardware components, or through a combination of both. Still further, it should be appreciated that reports may be generated from any combination of data stored on any combination of databases, files, stored procedures and the like.

Figure 4:
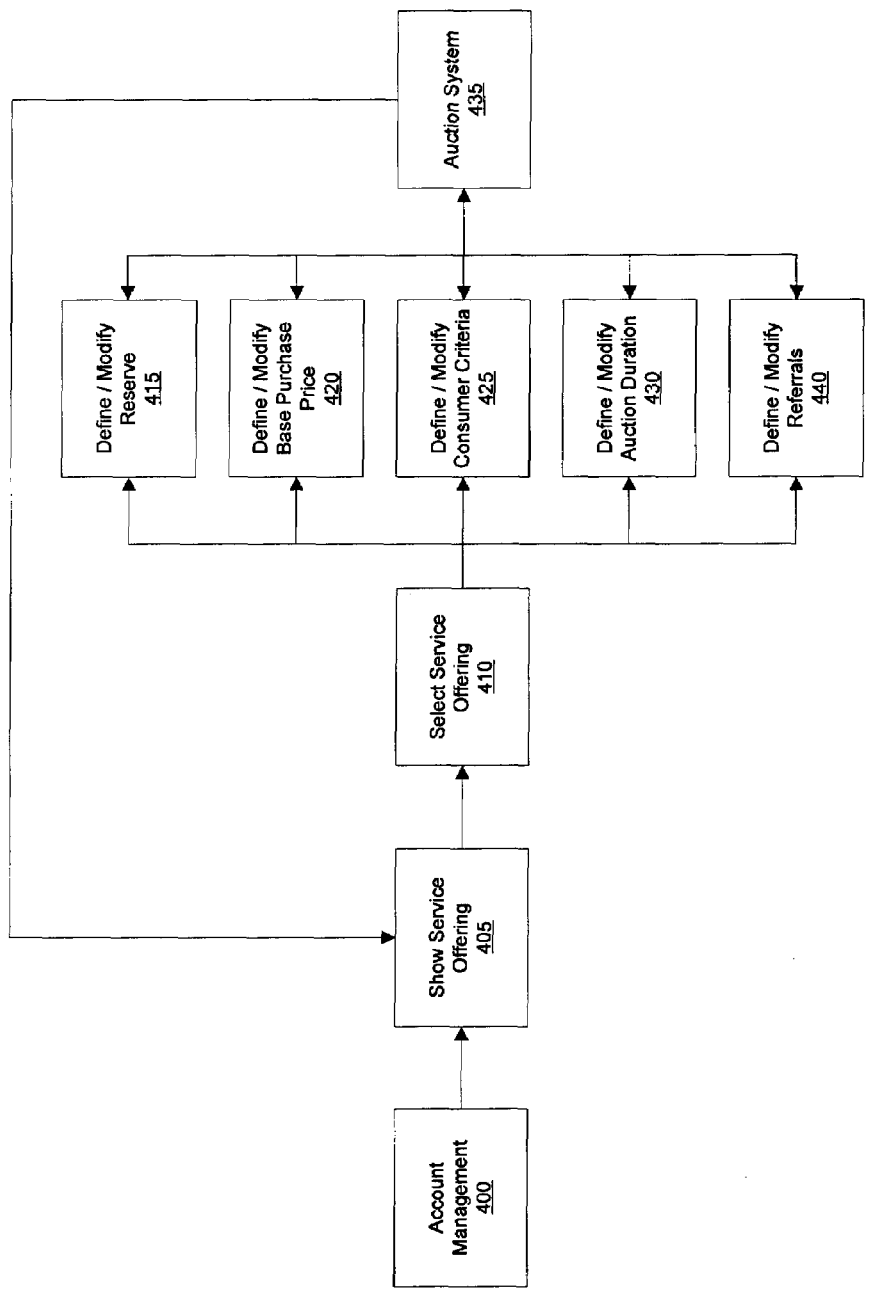
FIG. 4 is a flow chart illustrating a detailed view of an exemplary rules management process.

FIG. 4 is a detailed illustration of the rules management process as briefly described above in reference to FIG. 3. When provider 105 with a calendar auction account accesses the system, provider 105 may configure rules pertaining to an auction of provider's 105 services. A practitioner will appreciate that while not illustrated in FIG. 4, rules may be configured to apply universally to all of provider's 105 service auctions. However, as discussed herein, rules may be configured for each service individually, if desired. For example, provider 105 offering two distinct services, Service A and Service B, may choose to set the reserve amount for Service A to $85.00 per hour while setting the reserve for Service B to $110.00 per hour. To configure calendar auction rules, provider 105 may access a rules management webpage (step 400) following authentication as described above. From a rules management webpage (step 400), provider 105 may choose to view a service offering (step 405) as previously defined (220 in FIG. 2) and stored within the auction system (step 435). From a service offerings webpage (step 405), provider 105 may be prompted to select a service offering to view (step 410) and then prompted to select a specific rule to configure with regard to the selected service offering.

If provider's 105 input from the select service offering webpage (step 410) indicates a desire to define and/or modify a reserve, then provider 105 may be presented a webpage from which a reserve may be defined and/or modified (step 415). As in any of the management functions, the auction server (step 435) may be queried to obtain any previous values in order to allow provider to view previously defined rules. For example, provider 105 may have previously set a reserve amount for Service A to $90.00 per hour. When provider 105 accesses the define/modify reserve webpage (step 415), the webpage may display the previously set reserve amount ($90.00). If a reserve had not been previously set, the reserve amount may be displayed as $0.00. Provider 105 may change the reserve amount by entering a new reserve amount within a define/modify reserve webpage (step 415) and submitting the information to the auction system (step 435) where it may be stored within a member database 135.

If provider's 105 input from the select service offering webpage (step 410) indicates a desire to define and/or modify a base purchase price, then provider 105 may be presented a webpage from which a base purchase price may be defined and/or modified (step 420). A base purchase price may be any amount that provider 105 determines acceptable, should a consumer 100 during an auction choose to bypass the bidding process and purchase the service ("buy it now"), thus canceling the auction. Participation in a calendar auction with a base purchase price may be optional, therefore provider 105 may be prompted to indicate whether or not to implement a base purchase price. A provider 105 who wishes to set a base purchase price, may enter a desired amount in a webpage field and submit the information to the auction system (step 435) where it may be stored within a member database 135.

Figure 7:
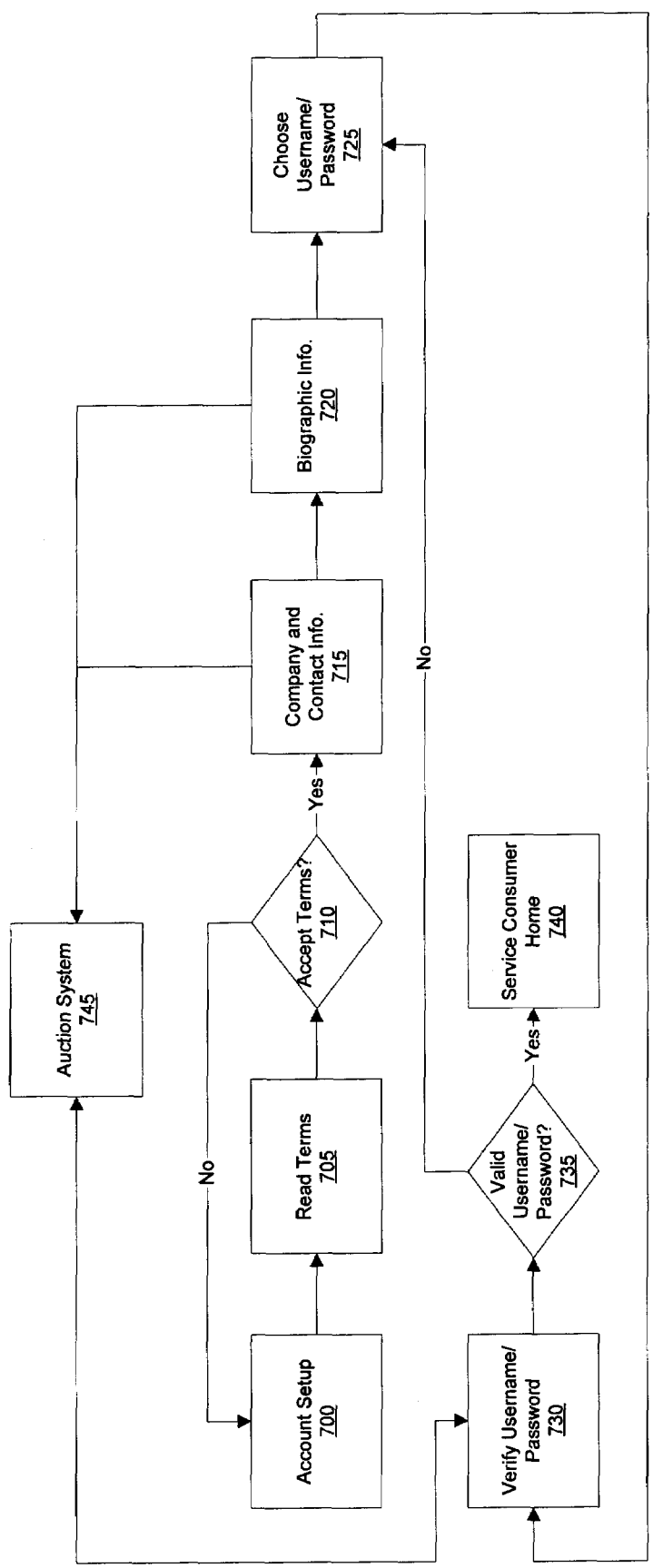
FIG. 7 is a flow chart illustrating an exemplary method for a consumer to register to begin participating in professional services auctions.

If provider's 105 input from the select service offering webpage (step 410) indicates a desire to define and/or modify consumer criteria, then provider 105 may be presented a webpage from which consumer criteria may be defined and/or modified (step 425). Consumer criteria would enable provider 105 to define who may or may not place bids on provider's 105 service(s) during calendar auction. For example, a provider 105 may choose to limit bid participation to consumers 100 with high credit ratings. Criteria used to define acceptable consumers 100 may not be limited only to information required by a consumer 100 during the consumer registration process as illustrated in FIG. 7. For example, while not illustrated, auction server 120 may initiate contact with any third party system such as one or more credit bureaus in order to obtain consumer's 100 credit rating and then store credit information to an auction system's 120 member database 140. Defined and/or modified consumer criteria may be submitted to the auction server (step 435) where it may be stored within a member database 135.

If provider's 105 input from the select service offering webpage (step 410) indicates a desire to define and/or modify auction duration, then provider 105 may be presented a webpage from which auction duration may be defined and/or modified (step 415). In an embodiment of the invention, duration may be defined in time. For example, a provider 105 may choose set an auction for Service A to last for 48 hours. At which time, the auction would close and the highest bidder, if applicable, would be awarded the calendar auction service. In another embodiment of the invention, provider 105 may choose to end an auction upon receiving a predetermined number of bids. In yet another embodiment, provider 105 may choose to end an auction when a bid of a determined amount has been obtained. Additions and/or changes to auction duration defined by a provider 105 may be submitted to the auction server (step 435) where it may be stored within a member database 135.

If provider's 105 input from the select service offering webpage (step 410) indicates a desire to define and/or modify referrals, then provider 105 may be presented a webpage from which referrals may be defined and/or modified (step 440). At any time, a provider 105 may opt-in or out of a referral program as well as add, modify, or delete referrals. Referrals may be participants in a calendar auction system, however this is not necessary. Participating providers 105 may be listed within a define and/or modify referral webpage (step 440) from which provider 105 may select one or more to serve as their referral(s). If a referral is not a participant in a calendar auction system, then a define and/or modify referral webpage may offer text fields where provider 105 may enter information such as Name of provider, address, telephone, email address, website address, contact name, relationship with provider, types of services offered, etc.

In an embodiment of the invention, a provider may additionally view other referral program details such as, for example, a rewards or finder-fee account balance, transactions which have occurred based on provider's 105 referral, and the like. Alternatively, this information may be included and accessible from a reports management (FIG. 3, step 340) webpage.

Additions and/or changes to provider's 105 referrals defined by a provider 105 may be submitted to the auction server (step 435) where it may be stored within a member database 135.

Practitioners will appreciate that changes in auction rules as described above, and with reference to FIG. 4, may not effect auctions in progress, but would be applicable to any scheduled auctions which have not yet opened to accept bids. However, in another embodiment, the system may allow rules and settings to apply at the time they are changed.

Figure 5:
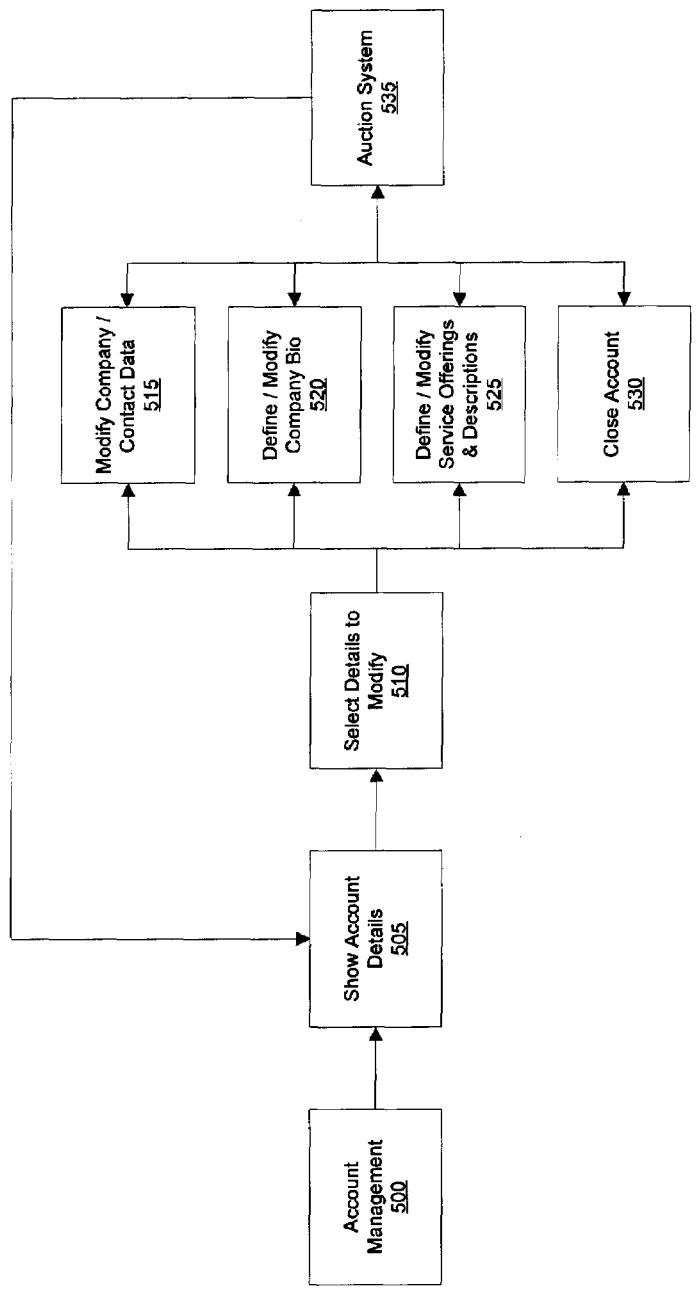
FIG. 5 is a flow chart illustrating a detailed view of an exemplary account management process of the auction system.

FIG. 5 is a detailed illustration of an exemplary account management process as briefly described above in reference to FIG. 3. When a provider 105 with a calendar auction account accesses the calendar auction system, provider 105 may add and/or modify calendar auction account information originally entered during the registration process (215 in FIG. 2). For example, a provider 105 who wishes to change the main contact name, may initiate the modification from an account management webpage (step 500). It should be appreciated that provider 105 may be prevented from modifying certain types of account data because certain data modifications may be a function of an account manager 165.

To define or modify account details, provider 105 may access the account management webpage (step 500) following authentication as described above. From an account management webpage (step 500), provider 105 may choose to view account details (step 505) as previously defined by provider 105 (215 in FIG. 2) and stored in an auction system (step 535) member database 135. From an account details webpage (step 505), provider 105 may be prompted to select a class of account information to modify (step 510). According to an embodiment of the invention, account information may be grouped within three classes, contact data, company biography, and service offerings and descriptions. It should be appreciated that the classes as illustrated and described herein have been grouped for simplicity only. Practitioners will appreciate that the account information as described herein is not intended to be exhaustive and may be arranged within any number of classes.

If provider's 105 input from the select details webpage (step 510) indicates a desire to add or modify company and/or contact data, provider 105 may be presented a webpage (step 515) displaying company and/or contact data as it exists within the auction server (step 535). Provider 105 may modify the information within the webpage (step 515) and submit the information along with any changes to the auction server (step 535) where it may be stored within a member database 135.

If provider's 105 input from the select details webpage (step 510) indicates a desire to add and/or modify biographic information, the provider 105 may be presented a webpage (step 520) displaying biographic data as it exists within the auction server (step 535). Provider 105 may modify the biographic information within the webpage (step 520) and submit the information with any changes to the auction server (step 435) where it may be stored within a member database 135.

If provider's 105 input from the select details webpage (step 510) indicates a desire to add and/or modify service offerings and descriptions, provider 105 may be presented a webpage (step 525) displaying service offerings as they exist within the auction server (step 535). In an embodiment, provider 105 may offer varying types and/or levels of service, therefore the auction system may allow for one or more services to be defined and managed. Provider 105 may use a webpage to modify service offerings (step 525) or to define additional services at any time. Provider 105 may add and/or modify service offerings information within a webpage (step 525) and submit the information along with any changes to the auction server (step 535) where it may be stored within a member database 135.

If provider's 105 input from the select details webpage (step 510) indicates a desire to close provider's 105 calendar auction account, provider 105 may be presented a webpage (step 530) to confirm provider's 105 intentions to no longer participate in a calendar auction system. In an embodiment of the invention, the close account webpage (step 530) may request additional information from provider 105 such as, for example, information to ascertain why provider 105 is closing a calendar auction account. When provider 105 submits the close account (step 530) information to the auction server (step 535), data pertaining to provider may be flagged or eliminated from any databases residing within an auction system 120.

Figure 6:
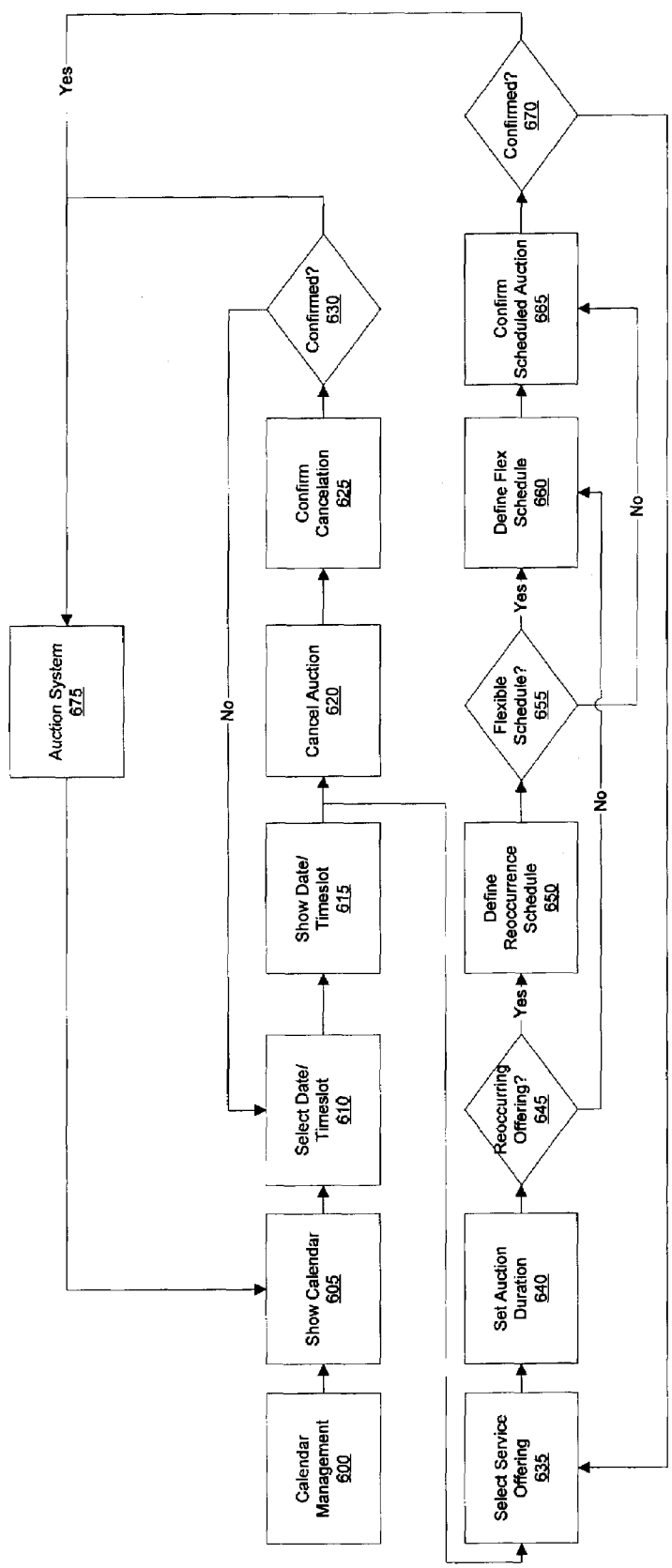
FIG. 6 is a flow chart illustrating a detailed view of an exemplary rules management process of the auction system wherein auctions are defined and scheduled.

FIG. 6 is a detailed illustration of an exemplary calendar management process as briefly described above in reference to FIG. 3. When provider 105 with a calendar auction account accesses the calendar auction system, provider 105 may setup and maintain a calendar in order to facilitate calendar auctions. In an embodiment of the invention, the calendar serves as the mechanism by which auctions for a provider's 105 services are scheduled. To manage a calendar, provider 105 may access a calendar management webpage (step 600) following authentication as described above. The calendar management webpage (step 600) may include snapshot information relevant to a provider 105 such as, for example, the status of in progress auctions, listed dates for upcoming auctions, warnings regarding scheduling conflicts, and the like.

In an embodiment of the invention, provider 105 may maintain two or more separate calendars. A calendar management webpage (step 600) may include a selector from which provider 105 may indicate which auction account calendar to view and/or modify. For example, provider 105 may be an owner of two or more business entities which fall under a parent company. Rather than create entirely different calendar auction accounts for each company, it may be advantageous to allow provider 105 to manage calendar auctions for each entity within one primary account.

When provider 105 selects a calendar to manage from a calendar management webpage (step 600), provider 105 may be presented a webpage displaying the selected calendar (step 605) populated with data from the auction system (step 675). As discussed previously, a calendar may be displayed in any number of configurations. It should be noted however, that an embodiment of the invention would allow provider 105 to define a preferred calendar view. For example, one provider 105 may prefer to view a calendar in weekly increments, while another provider 105 may prefer to view a calendar in increments of one month. While yet another provider 105, may prefer a calendar that displays all twelve months.

Aside from specific calendar configurations, sequences of time where provider 105 has scheduled auctions may be displayed in a manner as to communicate times of auction activity. For example, provider's 105 calendar (step 605) may reflect future auction dates by employing a method of color coding by which scheduled auction days would stand out from days of non-activity. The same may apply to auctions which are in progress. Other configuration are contemplated, such as displaying auction details on a calendar (step 605), for example, auction name, service offering, start time(s), end time(s), current high bid(s) for auctions in progress, etc.

In another embodiment, a calendar (step 605) may allow provider 105 to view demand for various service offerings. Consumer 100 may use a calendar, as will be discussed below, to express interest in a service or services during certain date/timeslots. The provider's 105 calendar may reflect the demand of any number of consumers, thereby allowing provider 105 to tailor service offerings and schedule auctions to best fit consumer demand as indicated on provider's 105 auction calendar. The system may automatically match openings in provider 105 and consumer 100 calendars and suggest possible availabilities.

From the auction calendar (step 605), provider 105 may select a date and/or timeslot to view in greater detail (step 615). Date/timeslot detail presents provider 105 a precise view of a selected date and/or timeslot. This view may include details regarding scheduled or in progress auctions such as, for example, description of service for auction, auction start time, end time, current high bid and the like. A date/timeslot view of a calendar, may provide options to allow provider 105 to schedule auctions, modify scheduled auctions and/or cancel scheduled auctions.

If provider 105 wishes to cancel a prescheduled auction, provider 105 may select the scheduled auctions date/timeslot (step 610) and select the scheduled auction from the show date/timeslot webpage (step 615). Provider 105 may then indicate that the scheduled auction should be canceled (step 620). Provider 105 may then be prompted or presented with a conformation webpage from which provider may be asked to confirm the cancellation (step 630). If provider 105 confirms the cancellation, then provider 105 may again be presented with a show calendar webpage (step 605) and the cancellation may be transmitted to the auction system (step 675) where the information relating to the scheduled auction may be removed from an auction database 140. If provider 105 does not confirm the cancellation, then provider 105 may again be presented with a select date/timeslot webpage (step 610) and the auction may remain scheduled.

If provider's 105 input from the date/timeslot view webpage (step 615) indicates a desire to schedule an auction or modify a previously scheduled auction, provider 105 may be presented a webpage and prompted to select a service (step 635) to offer for auction. Services may be displayed based on the services previously defined either during the registration phase (220, FIG. 2) or during the account management phase (525, FIG. 5). Services may be displayed on a service offerings webpage (step 635) as a list, a menu, group of check boxes, or by any number of methods known in the art. If provider 105 selects a service offering from the select service offering webpage (step 635), provider 105 may be presented a webpage or prompted to enter an auction duration (step 640). Provider 105 may choose to not change the displayed duration, which would be the default duration configured during the rules management process (430, FIG. 4). However, provider 105 may choose to enter a new auction duration (step 640) which would apply only to the auction being scheduled or modified.

Provider 105 may be prompted on whether or not the scheduled auction should be a reoccurring auction (step 645). In other words, provider 105 may desire to have the auction system 120 schedule the same auction repetitively over defined sequences. For example, a provider of legal services may choose to offer a service every other Thursday over a period of two months. If provider 105 selects to schedule an auction on a reoccurring basis (step 645), provider 105 may be presented with a webpage to define the reoccurrence schedule and duration (step 650).

Whether or not provider 105 schedules a reoccurring auction, provider 105 may be prompted to indicate whether or not they would like to define a flex schedule (step 655). If provider 105 chooses to define a flex schedule, then they may be presented a webpage enabling provider 105 to define a flex schedule (step 660) if desired. A flex schedule may enable a consumer 100 to purchase an approximate calendar timeslot at a lower rate and allowing provider 105 a certain amount of flexibility in when the service is delivered. For example, knowing that the volume of patients on any given day is difficult to predict, a provider 105 offering dental services may choose to offer a discount rate in exchange for scheduling flexibility. As a result, a consumer 105 who is viewing the dentist's auction may be given a visual alert indicating that this provider offers a flex discount to "buy it now" consumers 100. Consumers 100 who purchase an approximate timeslot within a predefined window (i.e. between 10:00 AM and 4:00 PM) may be notified by a provider 105 of an appointment at any time during a period starting with a purchase, and ending just prior to the appointment.

Whether or not provider defined a flex schedule, provider 105 may be presented a confirmation webpage (step 645) which may provide a summary of the auction as defined it in the proceeding steps. Provider 105 may be prompted to accept or cancel the pending auction. If provider 105 cancels the pending scheduled auction (step 650), provider 105 may again be presented with the select date/timeslot webpage (step 610) where scheduling data may be reentered. In this case, the schedule data may not be transmitted and stored on the auction system (step 655). If provider does accepts a pending scheduled auction (step 650), then the scheduled auction may be transmitted to the auction system (step 655) and stored in an auction database 140. Provider 105 may again be presented the show calendar webpage (step 605).

A consumer 100 may initiate the registration process through any methods known in the art. In one embodiment, a consumer 100 accesses the auction system 120 and initiates the account setup process (step 700) through a web browser 110. The account setup process may include determining if a consumer is a new user or a returning user through any method known in the art, for example, by the use of cookies, or direct user input. For example, a consumer may be presented with a temporary account setup webpage (step 700), which prompts the consumer 100 to input information concerning the consumer's 100 status as either a new or returning user.

According to an embodiment, account manager 165 may define data which is required to be entered by consumer 100 during the registration process. For example, an auction system 120 may not allow a consumer 100 to continue with the registration process without entering basic consumer information such as consumer name, address, telephone number, email address, etc. However, a calendar auction system may allow the registration process to continue if consumer 100 does not complete a biography of consumer's 100 company, if one exists.

Referring to FIG. 7, if it is determined that consumer 100 is new to a calendar auction system, as discussed above, consumer 100 may be presented with an account setup (step 700) webpage whereby the account setup process may be initiated. If consumer 100 chooses to initiate the account setup process, consumer 100 may be presented a webpage containing terms (step 705) for participating in a calendar auction system. Further, consumer 100 may be prompted to read the terms and provide input indicating whether or not consumer 100 accepts the terms. If consumer's 100 input indicates that the terms are not accepted (step 710), registration may not be continued and consumer 100 may be again presented with an account setup (step 700) webpage. However, if consumer's 100 input indicates that the terms are accepted (step 710) then consumer 100 may be presented a webpage for which to enter consumer and contact information (step 715). Such information may include, for example, name, address, telephone number, name of a contact, email address, website, etc. When consumer 100 completes and submits consumer and contact information (step 715), it may be transmitted to the auction system (step 745) where it may be committed to a member database 135.

Consumer 100 may then be presented a webpage to enter biographic information (step 720) which may include, a short history of Consumer 100 company, a description of the management team, client list, stock symbol, balance sheet data, credit rating, etc. Upon submitting biographic information (step 720), it may be transmitted to the auction system (step 745) where it may be committed to a member database 135.

Consumer 100 may then be presented a webpage where Consumer 100 may be prompted to choose a user ID and/or password (step 725). The user ID and/or password may be used by the auction system 120 to verify Consumer 100 identification prior to participation in a calendar auction system. Consumer 100 may submit a username and/or password selection to auction system (step 745) where it may be verified (step 730). If a user ID and/or password is not verified (step 735), consumer 100 may again be presented a choose user ID/password webpage (step 725) where consumer 100 may select a different user ID and/or password. If a user ID and/or password are valid (step 735) then consumer 100 may be presented a consumer home webpage (step 740).

Figure 8:
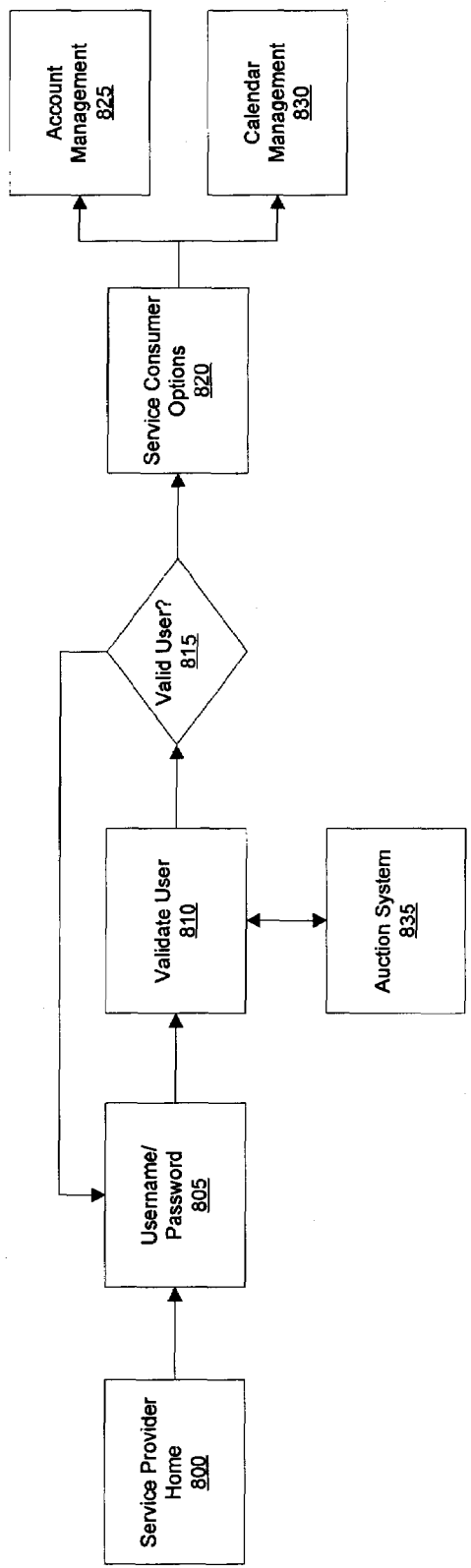
FIG. 8 is a flow chart illustrating an exemplary method for a consumer to securely login to the auction system to manage account details and the auction calendar.

Referring now to FIG. 8, a consumer homepage (step 800) may present consumer 100 with a variety of information relating to a calendar auction system. For example, in various embodiments, consumer homepage (step 800) may present consumer 100 with general auction statistics or news relating to consumer's 100 hometown or industry that might be of interest to consumer 100.

In an exemplary embodiment, a management process may provide for a central location where consumer 100 may manage aspects of a calendar auction account. A consumer 100 may access a consumer homepage (step 800). If consumer 100 chooses to view and/or modify consumer option (step 820), consumer 100 may be prompted to enter a user ID and/or password (step 805). Once the user ID and/or password is entered, it may be transmitted to the auction system (step 835) to be authenticated. If consumer 100 is properly authenticated (step 815), consumer 100 may be granted access to a consumer options webpage (step 820). A consumer 100 who is not properly authenticated, either through user error or because of unauthorized use, is not permitted to further access to consumer options (step 820) and may be again prompted (step 805) to enter a user ID and/or password. Practitioners will appreciate that many additional security measures may be employed in accordance with the login and authentication systems and methods described herein. A consumer options webpage (step 820) may contain links directed toward managing various aspects of consumer's 100 calendar auction account. Calendar auction options which may be viewed and/or modified by consumer 100 may include, account management (step 825) and calendar management (step 830).

An account management webpage (step 825) may be accessed by consumer 100 to add and/or modify consumer specific information as submitted during the registration steps as illustrated in FIG. 7. Specifically, consumer 100 may add and/or modify consumer, company and contact information as entered (715 in FIG. 7). Such information may include consumer name, company name, contact name, street address, telephone number, email address, web site, and the like. Account management (step 825) may also be used to add and/or modify consumer's 100 biographical information as entered (720 in FIG. 7). The account management process will be described in greater detail below with a discussion of FIG. 9.

Figure 9:
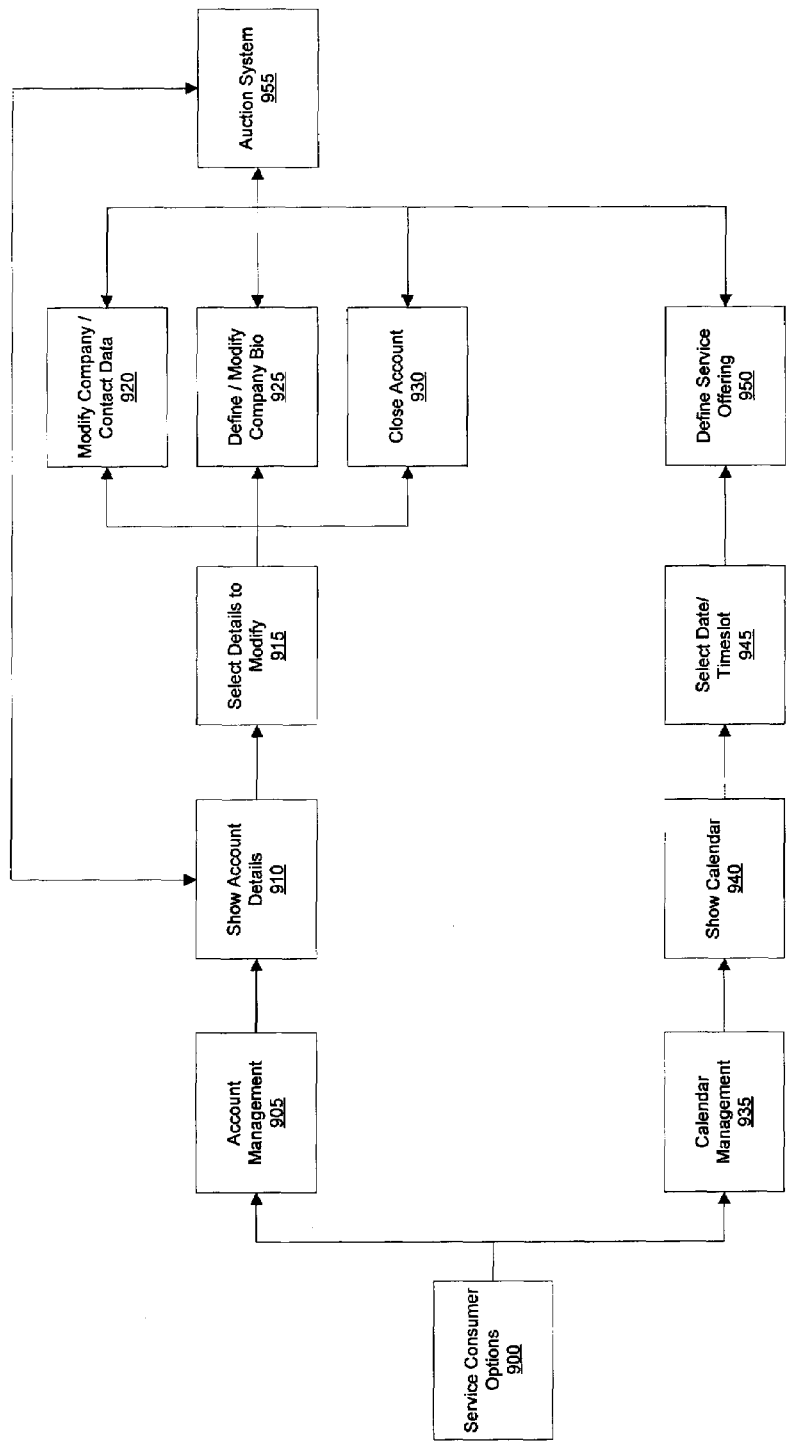
FIG. 9 is a flow chart illustrating a detailed view of exemplary consumer account management and calendar management processes of the auction system; and, FIG. 10 is a flow chart illustrating an exemplary auction process wherein auctions are defined and scheduled.

A calendar management webpage (step 830) may be accessed by consumer 100 to express interest in one or more of provider's 105 service(s). Consumer 100 may access a calendar for any time period as defined by an auction account manager 165. In one embodiment, a consumer 100 may access a calendar for a particular month by selecting a month from a list, however practitioners will appreciate that that various other options may be provided for displaying calendars or elements of time. Calendar management may allow consumer 100, for example, to express a need for certain professional services at a defined date and time, thereby inviting or encouraging provider 105 to offer such services for auction over the dates and times indicated by consumer 100. FIG. 9 is a detailed illustration of an exemplary account management and calendar management processes as briefly described above in reference to FIG. 8. When consumer 100 with a calendar auction account accesses the calendar auction system, consumer 100 may add or modify calendar auction account information which may have been originally entered during the registration process (715 in FIG. 7). For example, consumer 100 who wishes to change a main contact name, may initiate a change through an account management webpage (step 905). It should be appreciated that consumer 100 may be prevented from modifying certain types of account data because the modifications may be a function of an account manager 165.

In order to define and/or modify account details, consumer 100 may access the account management webpage (step 905) following authentication as described above. From an account management webpage (step 905), consumer 100 may choose to view account details (step 910) as previously defined by consumer (715 in FIG. 7) and stored in the auction system (step 955). From an account details webpage (step 910), consumer 100 may be prompted to select a class of account information to modify (step 915). According to an embodiment, consumer's 100 account information can be grouped within two classes, company and contact information and biographical information. It should be appreciated that the classes as illustrated and described herein have been grouped for simplicity. Practitioners will appreciate that the account information as described herein is not intended to be exhaustive and may be arranged within any number of classes.

If consumer's 100 input from the select details webpage (step 915) indicates a desire to add and/or modify company and/or contact information, consumer 100 may be presented a webpage (step 920) displaying company and/or contact information as it exits within an auction server (step 955). Consumer 100 may modify the information within the webpage (step 920) and submit the information along with any changes to the auction system (step 955) to be stored within a member database 135.

If consumer's 100 input from the select details webpage (step 915) indicates a desire to add and/or modify biographic information, consumer 100 may be presented a webpage (step 925) displaying biographic information as it exists within an auction server (step 955). Consumer 100 may modify the biographic data within the webpage (step 925) and submit the information along with any changes to the auction system (step 955) to be stored within a member database 135.

If consumer's input from the select details webpage (step 915) indicates a desire to close consumer's 100 calendar auction account, consumer 100 may be presented with a webpage (step 930) to confirm consumer's 100 intention to no longer participate in a calendar auction system. In an embodiment of the invention, the close account webpage (step 930) may request additional information from a consumer 100 such as, for example, information to ascertain why consumer 100 is closing a calendar auction account. When consumer 100 submits the close account (step 930) information to the auction server (step 955), information pertaining to consumer 100 may be eliminated from the auction system (step 745) databases.

In one embodiment, a consumer may elect to receive notifications regarding upcoming auctions which may fall within consumer 100 defined interests or any other announcements, solicitations, newsletters, and the like. Further, information regarding consumer's 100 bidding habits, servicing needs, company information, calendar entries, etc. may be distributed to providers 105 either in the form of reports, as discussed above, or any other distribution system and/or method. The calendar auction system may provide preferences during account setup and/or account maintenance for consumer 100 to opt-in or opt-out for notifications and/or the distribution of consumer's 100 data.

Referring back to consumer options (step 900), consumer 100 may choose to set up and manage a calendar. As previously discussed, a calendar may be provided to enable a consumer 100 to express interest in specific services for specific date/timeslots. To setup or manage a calendar, consumer 100 may access a calendar management webpage (step 935) following authentication as described above. A calendar management webpage (step 935) may include snapshot information relevant to a consumer such as, for example, a scheduled auction corresponding to one or more services that consumer 100 previously expressed interest and status of in progress auctions.

Further, a calendar management webpage (step 935) may incorporate a search engine in order to allow consumer 100 to define specific criteria for auctions and/or providers. For example, a consumer 100 of cleaning services may be interested in providers 105 who offer cleaning services after 3:00 AM. A consumer 100 may use a search engine interface to enter their parameters and a search engine may return a list of providers 105 and/or auctions matching the criteria. While not illustrated in FIG. 9, practitioners will appreciate that there are a number methods for employing search engines within an software application or Internet environment.

From a calendar management webpage (step 935), consumer 100 may select a date/timeslot for which to view a calendar. When consumer 100 is provided an auction calendar for the selected date/timeslot (step 940), consumer 100 may select a date and/or timeslot to view in greater detail (step 945). To express interest in a service, consumer 100 may define a desired service in detail (step 950), which may include, for example, a description of the service, date and time service is needed, duration of needed service, and the like. After defining the needed service or redefining a needed service previously entered into the calendar, consumer 100 may submit the calendar to the auction system (step 955) where it may be stored within a member database 135 and made available to provider's 105 to view within their calendar.

Figure 10:
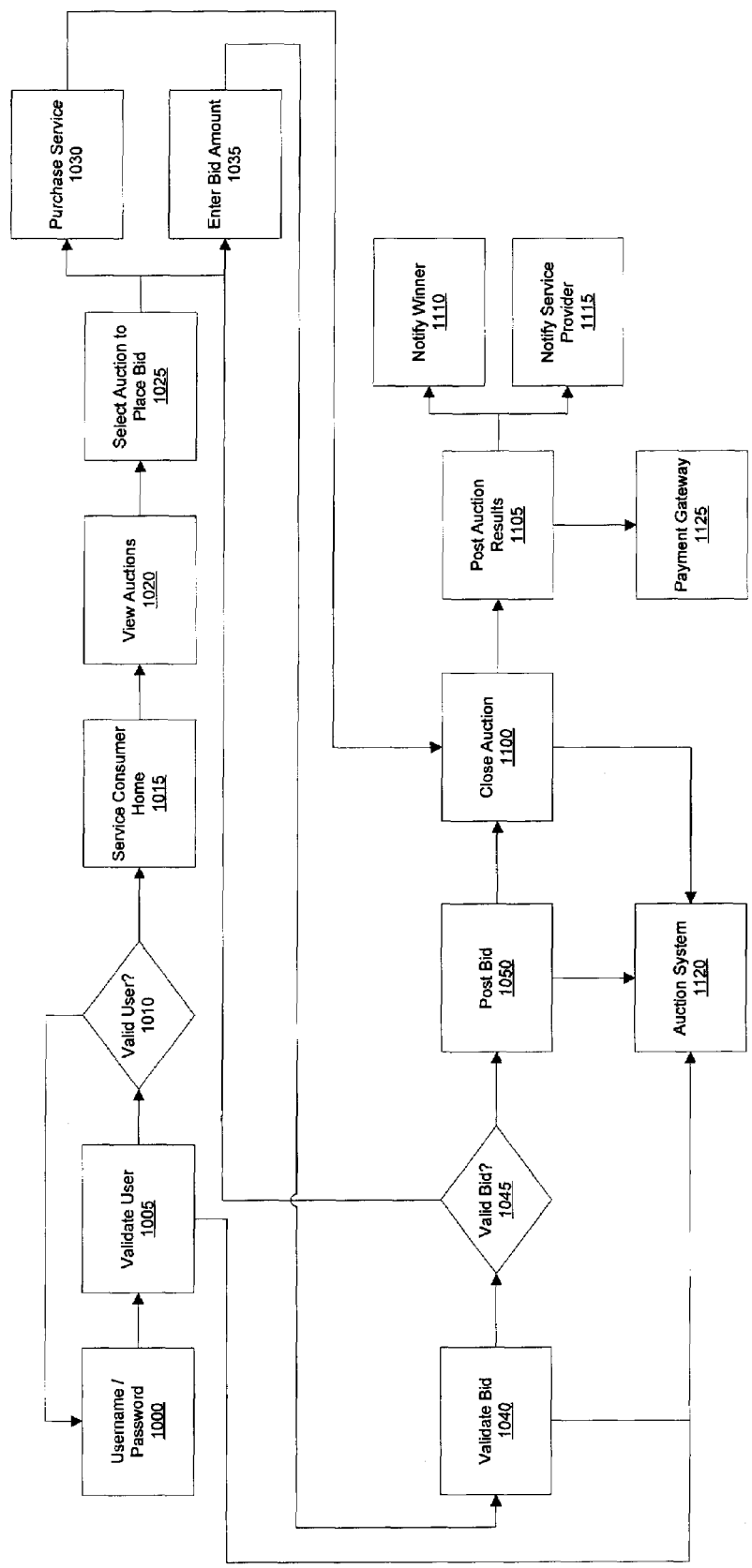

Referring now to FIG. 10, consumer 100 may participate in a calendar auction by navigating to a calendar auction website and selecting a link to a consumer homepage (step 1015). If consumer 100 is not logged in to a calendar auction system, consumer 100 may be prompted to enter a user ID and/or password (step 1000). Once the user ID and/or password is entered, it may be transmitted to the auction system (step 1120) to be authenticated. If consumer 100 is properly authenticated (step 1005), consumer 100 may be granted access to a consumer homepage 1015.

Consumer 100 may select a link on the consumer homepage (step 1015) to view auctions (step 1020). A view auctions webpage (step 1015) may contain detailed information for each auction listed. However, practitioners will appreciate that there are a number of ways for viewing information specific to a selected auction including, for example, a separate webpage or a popup window. Information regarding an auction may include a service description, provider's name, provider's biography, a link to provider's website, auction start time, auction end time, reserve amount, winning bid, number of bidders, and the like.

Consumer 100 may place a bid on an auction item, by selecting an auction item for which to enter a bid (step 1025). Consumer 100 may have an option of purchasing the service outright (if provider 105 chose to offer a purchase option for the selected offering), or entering a bid amount in excess of the current high bid. Consumer 100 may choose to purchase the service (step 1030), and thus bypass the bidding process, by selecting a "buy it now" link. If consumer 100 chooses to bypass the bidding process, the auction is closed (1100) and no further bids are accepted. However, if consumer 100 chooses to place a bid on the offering, consumer 100 may be prompted to enter a bid amount (step 1035). When a bid amount is entered and submitted, the bid amount is transmitted to the auction system (step 1120) where it is validated (step 1040) against a previous high bid and a reserve amount if any. If a bid amount does not meet both criteria, the bid amount is not valid (step 1045) and consumer 100 may be notified of the deficiency and prompted to enter a bid (step 1035) that is inline with the criteria. If consumer's 100 bid amount is determined to be a valid (step 1045), the bid amount is posted (step 1050) to the auction server (step 1120) where it is stored in an auction database 140 as a new high bid for the service item.

The system may require the consumer to previously establish a financial account (e.g., charge card or pre-paid cash to an account) or financial arrangement (e.g., credit application) with the system to ensure the availability of funds, loyalty points, etc used in any bid. As such, the system may also confirm that consumer 100 has sufficient funds or credit to support the submitted bid amount. The system may also hold certain funds during the auction process and release the funds if the consumer does not win the bid.

When an auction duration has expired, as previously defined by a provider 105, the auction may close (step 1100). The auction system (step 1120) may determine which participating consumer 100, if any, won the auctioned calendar slot. If a winning bid is validated, the results are posted to a calendar auction website (step 1105) and information required by a payment gateway (step 1125) regarding provider 105, consumer 100, and bid amount are transmitted to the payment gateway (step 1125) for processing. Practitioners will appreciate that there exists a number of payment systems which are known in the art.

Following the posting of auction results (step 1105) and transmittal of payment details to a payment gateway (step 1125), notification may be sent to both consumer 100 with the winning bid and to provider 105 of the service. The system may also notify consumer 100, provider 105, account manager 165 and/or any other third party (via any communication device discussed herein or known in the art) regarding any data, results or actions during any phase of the system. For example, the system may notify provider 105 when each bid is submitted or when a bid above a certain amount is submitted. The system may also automatically calendar the winning timeslot on each participant's calendar. In one embodiment, the system may also temporarily calendar a timeslot (e.g., with a temporary designation) on one or more participant's calendars after a consumer submits a bid for a timeslot, but before the winning bid is selected.

In one embodiment, a calendar auction may provide a system and/or method for a consumer 100 holding a winning bid to sell the winning bid to another interested and willing consumer 100. This functionality may be employed by any number of means, however it is contemplated that a consumer 100 with a winning bid may have a system and/or method to indicate that they are willing to receive offers on the winning bid. Further, consumer 100 may set a price they are willing to accept for the bid. Another consumer 100 interested in purchasing the bid, may indicate a willingness to do so either through functionality built into a calendar auction system, or contact information may be provided for person-to-person negotiation. A calendar auction system may also allow a consumer 100 who has purchased a service through a "buy it now" step, to sell the rights to the service timeslot. A consumer 100 purchasing a timeslot from another consumer 100 may be subject to the same verification as illustrated in FIG. 4, step 410.

Various other embodiments of the invention may provide features which may add to the calendar auction's functionality, utility, and appeal. With respect to content, which may be made available for calendar auction users, a calendar auction system 120 may provide a system and/or method for a provider 105 and/or a consumer 100 to upload files to be stored in an auction system 120 database and may include, for example, photos, graphics, .PDF files, sound files and the like. These files may comprise photo portraits of management teams, company logos, photos relating to services, white papers, press releases, news articles, recorded statements, etc.

An auction system 120 may provide views of upcoming auctions, past auctions (including auction descriptions, winning bid details, etc.), a winning bid photo gallery, and the like. Additionally, consumer 100 and provider 105 may be provided a system and/or method to control webpage views, appearance, layout, etc. For example, an auction system 120 may provide controls which may be used by an auction site user to apply a color scheme to the calendar auction webpages according to the user's preference.

An auction system 120 may provide a bid history page where a consumer 100 and/or provider 105 may view a bid history for a selected auction. Bid history may include, for example, the identities of top bidders, bid values, date and time bids were submitted and the like. A bid history may provide a view of bids relating only to auctions a consumer 100 or provider 105 has participated in, or for all auctions occurring over a period of time. In addition, a bid history view may be configured by a consumer 100 and/or provider 105 according to their preferences.

An auction system may include a system and/or method for a consumer 100 to rate a provider 105 based on past experience with the provider 105. A rating system may be open to all registered and/or unregistered consumers 100 or may be limited to those who have placed a winding bid on a prior calendar auction for the provider's service. A rating system may also include a system and/or method for a provider 105 to rate consumers 100. This may be useful in determining which consumers 100 bids provider 105 may accept or decline in current and/or future auctions.

An auction system 120 may visually group calendar auctions according to predefined categories such as, for example, Accounting Services, Legal Services, Domestic Services, Health Services, Consulting Services, and the like. Auction groupings may also include indicators to show how many auctions are in progress or scheduled within each category. Alternatively, calendar auctions may be grouped according to a user's preferences.

An auction system 120 may provide a system and/or method to enable a user to search an auction system 120 for auctions based on one or more search keywords. Additionally, a consumer 100 may search for a provider 105 by inputting a nickname or a number which may be uniquely associated a particular provider 105. Practitioners will appreciate that there are a number of methods for facilitating and executing a search within an Internet environment which may be implemented within an auction system 120.

An auction system 120 may provide users with a system and/or method to obtain online help. Online help may be implemented through one or more frequently asked questions webpages where a user may view answers to commonly asked questions. Online help may also include an online form where a user may enter problems, questions, suggestions, etc. and submit the entry to an auction server 120. Answers and/or responses based on a user's submission may be delivered to a user by any means known in the art including email, a webpage, telephone response, postal mail, etc. An auction system 120 may also employ live help to assist users in real-time. Live help may provide a means for a user to submit specific questions, problems and/or concerns to a live customer support representative and receive a response in real-time. Live help may be facilitated through a chat-like environment similar to those offered my MSN Messenger and Yahoo! Messenger. Live help may also employ computing logic to decipher information submitted by a user and respond based on a pre-defined response which may be stored within an auction system 120.

Additionally, an auction system 120 may notify a consumer 100 of upcoming auctions which might be of interest. Notification may be delivered via any method known in the art such as, for example, email, text message to a cell phone or pager, recorded message over a telephone, etc. An auction system 120 may provide a system and/or method for consumer 100 to define criteria indicating interest in certain types of auctions. Additionally, auction system 120 may use consumer's 100 prior bid history to determine which auctions consumer 100 may be interested in.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method for facilitating a calendar auction between at least one consumer and at least one provider, said method comprising steps of:
    posting an available service accessible through a computerized network, wherein said service includes an available timeslot on a provider calendar when said service is offered to be performed and said at least one provider provides varying levels of service for said service;
    receiving from a consumer a bid for said service, wherein said bid is based at least in part upon said service and said available timeslot, and wherein said bid may specify any form of payment of a plurality of payment forms;
    selecting said bid as a winning bid;
    notifying said consumer and said at least one provider of said winning bid; and
    directing at least one losing bidder to an offering by said at least one provider, said offering including a lower level of service for said service than won by said consumer.

2. The method of claim 1, wherein said step of posting an available service further includes posting provider information.

3. The method of claim 1, wherein said step of posting an available service further includes notifying a consumer of said posted available service.

4. The method of claim 1, wherein the plurality of payment forms includes cash, a transaction account, a transaction instrument, a negotiable instrument, a gift card, a rebate, securities, loyalty points, and barter.

5. The method of claim 1, wherein said step of posting an available service includes posting at least one of accounting services, legal services, consulting services, action, non-action, agreements, assistance, guidance, access, advice, physical help, mental help, medical advice, legal input, financial advice, mentoring, counseling services, internet access, access to computer services, coaching services, shopping services, entertainment, experiences, and donation services.

6. The method of claim 1, further comprising a step of receiving auction rules.

7. The method of claim 1, further comprising a step of receiving auction rules including at least one of an auction duration, a reserve amount, a reoccurrence schedule, and consumer preferences.

8. The method of claim 1, wherein said step of posting an available service includes receiving available service information from a provider.

9. The method of claim 1, further comprising a step of notifying at least one of a consumer, a provider, and an account manager of receiving a bid.

10. The method of claim 1, further comprising a step of notifying at least one of a consumer, a provider, and an account manager of receiving a bid over a predetermined amount.

11. The method of claim 1, further comprising a step of placing said service in said timeslot on at least one of a consumer calendar and said provider calendar as a temporary entry until bidding is completed.

12. The method of claim 1, wherein said step of selecting said bid as a winning bid includes receiving a request from a consumer to purchase said service for a predetermined price.

13. The method of claim 1, wherein said step of notifying said consumer and said at least one provider of said winning bid includes sending a notification via at least one of email, pager, telephone, text message or voicemail.

14. The method of claim 1, wherein said step of notifying said consumer and said at least one provider of said winning bid includes placing said service in said timeslot on at least one of a consumer calendar and said provider calendar.

15. The method of claim 1, further comprising a step of awarding loyalty points to at least one of a provider and a consumer.

16. The method of claim 1, further comprising a step of referring said bid to a second provider.

17. The method of claim 1, further comprising a step of providing a referral database.

18. The method of claim 1, further comprising a step of providing service offerings of providers.

19. The method of claim 1, further comprising a step of providing reports to providers, wherein said reports include at least one of service information, bid information, and consumer information.

20. The method of claim 1, further comprising a step of providing a finder's fee to a provider for referring a bid to a second provider.

21. The method of claim 1, further comprising a step of canceling said calendar auction.

22. The method of claim 1, further comprising a step of enabling a provider to allow a reoccurring auction for a particular service.

23. The method of claim 1, wherein said step of posting an available service further includes posting a service that includes a flex schedule.

24. The method of claim 1, further comprising a step of notifying a consumer of certain calendar auctions.

25. The method of claim 1, further comprising a step of searching services pursuant to a request of said consumer.

26. The method of claim 1, further comprising a step of facilitating redistribution of said winning bid.

27. The method of claim 1, further comprising a step of providing reports to providers, wherein said reports include at least one of service information, bid information, and consumer information, wherein said service information, said bid information, and said consumer information includes at least one of bids received, amount of bids received, distribution of bids received, identity of bidder, location of bidder, time of bid placement, date of bid placement, and service pricing.

28. The method of claim 1, further comprising a step of providing reports to providers to facilitate at least one of service pricing, marketing plans, cash flow management, business capacity provisioning, and resource provisioning.

29. A computer-readable storage medium having stored thereon sequences of instructions, the sequences of instructions including instructions which when executed by a processor causes the processor system to perform:

posting an available service accessible through a computerized network, wherein said service includes an available timeslot on a provider calendar when said service is offered to be performed and at least one provider provides varying levels of service for said service;

receiving from a consumer a bid for said service, wherein said bid is based at least in part upon said service and said available timeslot, and wherein said bid may specify any form of payment of a plurality of payment forms;

selecting said bid as a winning bid;

notifying said consumer and said at least one provider of said winning bid; and directing at least one losing bidder to an offering by said at least one provider, said offering including a lower level of service for said service than won by said consumer.

* * * * *